July 19, 1960  C. R. HANNA  2,945,478
HIGH FREQUENCY RESPONSE VALVE
Filed June 19, 1957  3 Sheets-Sheet 1

INVENTOR
Clinton R. Hanna
BY
George C. Thompson Jr.
ATTORNEY

July 19, 1960   C. R. HANNA   2,945,478
HIGH FREQUENCY RESPONSE VALVE
Filed June 19, 1957   3 Sheets-Sheet 2

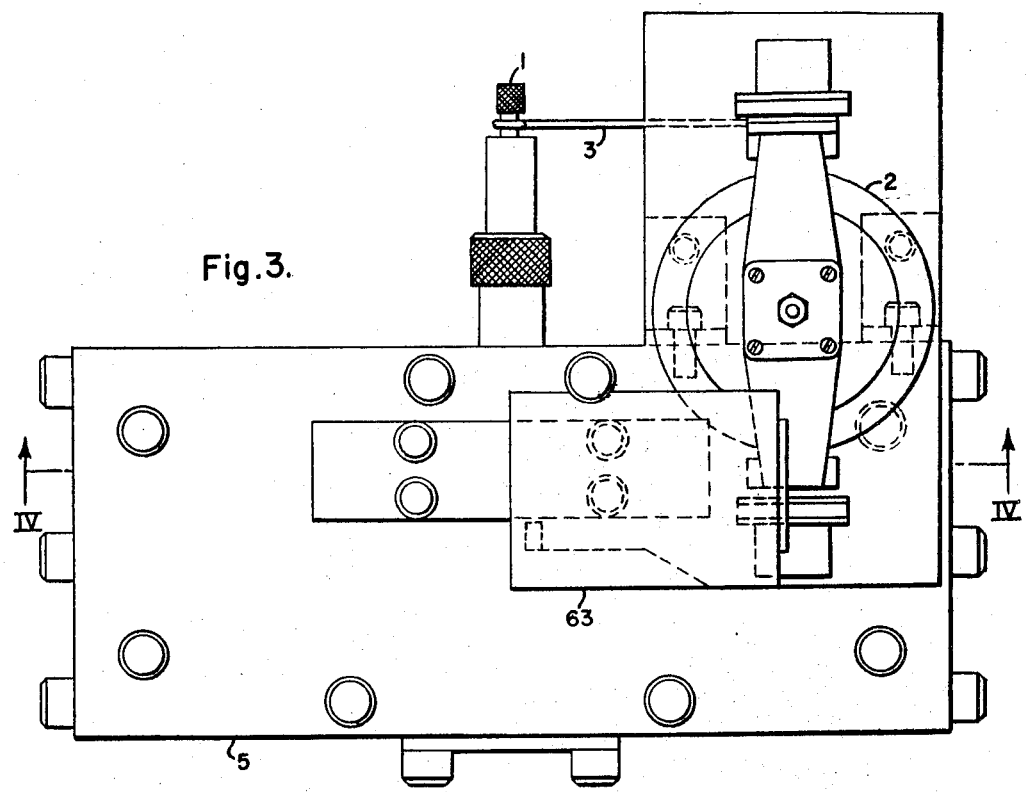
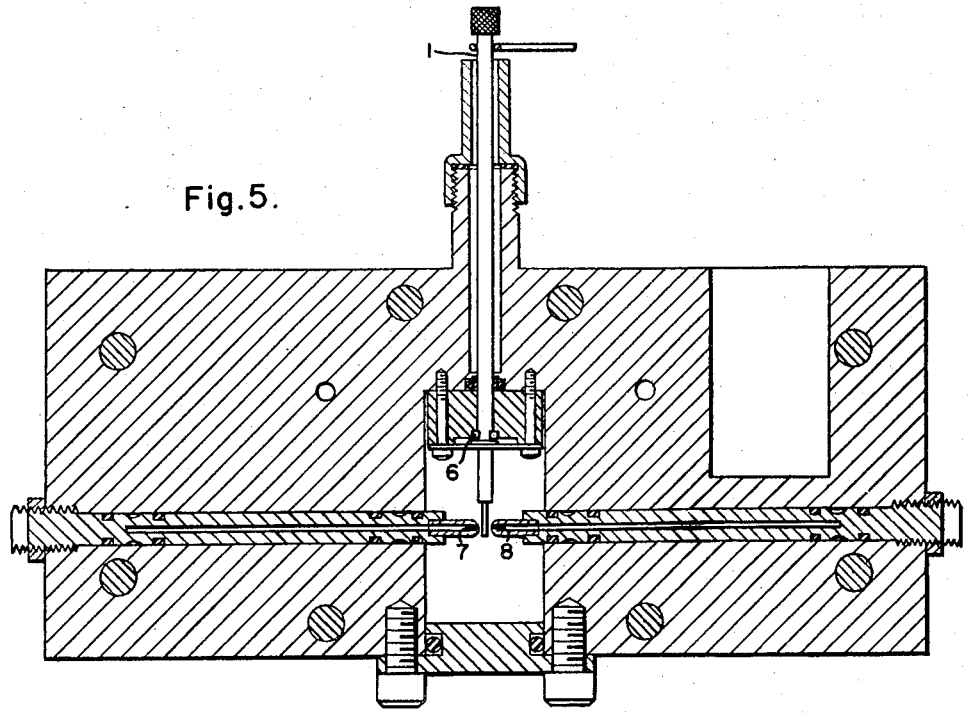

United States Patent Office 2,945,478
Patented July 19, 1960

2,945,478

HIGH FREQUENCY RESPONSE VALVE

Clinton R. Hanna, Pittsburgh, Pa., assignor to Westinghouse Electric Corporation, East Pittsburgh, Pa., a corporation of Pennsylvania Filed June 19, 1957, Ser. No. 666,736

7 Claims. (Cl. 121—41)

This invention relates to a high frequency response valve and, more particularly, to a valve capable of response to dynamic inputs while at the same time eliminating outputs during long period or continuous input signals.

It has been found that some types of aircraft during periods of manual control require stability augmentation to prevent continuous pilot flight monitoring. This augmentation, however, must be capable of response to changes in aircraft position of a frequency above that capable of being adequately corrected by the pilot of the craft. A valve in order to do this job must also be capable of ignoring, or eliminating long period responses that are correctible by manual operation of the pilot.

It is therefore an object of this invention to provide a high frequency responsive valve capable of eliminating valve outputs during continuous or long period input signals.

It is another object of this invention to provide a high frequency response valve provided with a dynamic response piston capable of eliminating low frequency outputs.

Other objects, purposes and characteristic features will become obvious as the description of the invention progresses.

In practicing this invention, there is provided a control valve having two stages, one of which is controlled by a gyro or other suitable means such as a torque motor. The other stage of this valve is capable of response to output fluid pressures of the gyro controlled portion of the valve through the use of a movable piston biased to a central position within its actuation cylinder. During movements of the second stage piston in response to the gyro controlled first stage output pressures, the second stage delivers work actuator output pressures for control of an aircraft or other control surface. When the second stage piston bias means is equal to and opposite to the first stage delivered pressure, the second stage piston ceases to deliver any further changes in output pressure to control the work actuator.

Fig. 3 is a plan view of the gyro mounted in position on the control valve of this invention.

Fig. 5 is a view taken along line V—V of Fig. 2 showing the gyro input control of the first stage of the valve of this invention; and Fig. 6 is a view of a torque motor capable of controlling the first stage of the valve of this invention.

In each of the several valves similar parts bear like reference characters.

Figure 1:
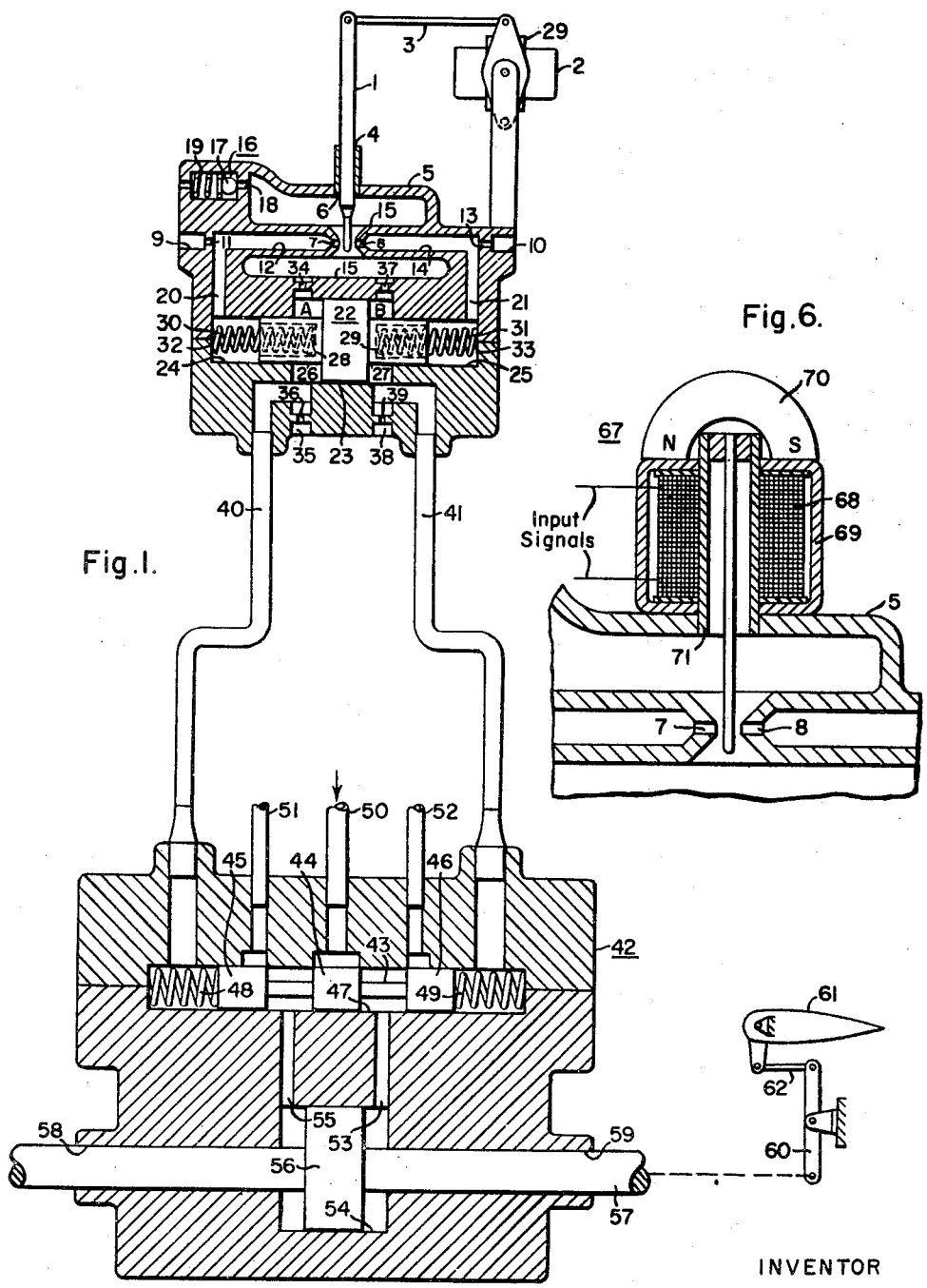
Figure 1 is a diagrammatic view of a two-stage valve and work actuator of this invention partially sectioned to better illustrate the operation.

The embodiment of this invention shown in Fig. 1 comprises a two-stage control valve provided with a gyro controlled vane member which is controlled by a gyro 2 through a mechanical drive link 3. The control vane 1 is received within an opening 4 in a first stage valve body 5 and pivots about an O-ring seal 6 to allow its extremity to vary its position between two orifices 7 and 8 placed in opposing spaced apart relationship. The orifices 7 and 8 are provided with fluid under pressure through incoming pipes 9 and 10 provided with fluid from a source of pressure, not shown. Fluid from the source pipe 9 passes through a restricted opening 11 spaced from the orifice 7 by the pipe 12. Fluid from the pipe 10 passes through a restricted opening 13 spaced from the orifice 8 by a pipe 14. Fluid passing through the orifices 7 and 8 empties into a reduced pressure chamber 15 provided with a return path to a main reservoir, not shown, through a pressure level valve 16 provided with a spring biased ball 17 capable of being forced against the return port 18 by a spring 19.

The pipe 12, between the orifice 7 and the restricted opening 11, is provided with an output passage 20 for use with the second stage to be explained hereinafter. Likewise, the pipe 14, between the orifice 8 and the restricted opening 13, is provided with an output passage 21 to the second stage to be explained hereinafter.

The second stage of this control valve comprises a piston 22 positioned within a cylinder 23 having two outwardly extended reduced area portions 24 and 25 capable of receiving reduced diameter portions 26 and 27, respectively, of the piston 22. The reduced diameter portions 26 and 27 of the piston 22 are provided with recesses 28 and 29, respectively, for receiving bias springs 30 and 31, respectively. The bias springs 30 and 31 engage the ends 32 and 33, respectively, of the cylinder portions 24 and 25, respectively. In this way, the piston 22 is biased to a center position equidistant from the ends 32 and 33 of the cylinder 23.

The output pipe 20 of the first stage therefore connects with the cylinder portion 24 in the area between the end wall 32 and the piston portion 26. Likewise, the output pipe 21 of the first stage connects to the cylinder portion 25 in the area between the piston portion 27 and the end wall 33.

The main portion of the piston 22 when placed within the cylinder 23 separates the cylinder 23 into the chambers A and B. The chamber A is provided with a fluid input passage from the reduced pressure chamber 15 through a restricted opening 34 and is provided with a fluid output passage 35 through a restricted opening 36. Likewise, the chamber B is provided with a fluid input from the reduced pressure chamber 15 through the restricted opening 37 and a fluid return through the passage 38 including the restricted opening 39. It, therefore, can be seen that fluid in the reduced pressure chamber 15 in addition to the return path through the return pipe 18 is provided with fluid return paths through the fluid return pipes 35 and 38 including the restricted openings 34, 36, 37 and 39.

In addition to these passages, the chambers A and B are provided with control output passages 40 and 41, respectively, connected to the boost valve portion of a work actuator 42. The boost valve of the work actuator 42 comprises a spool valve 43 provided with three spaced apart land areas 44, 45 and 46. The spool valve 43 is positioned within a cylinder 47 and is provided with a pair of bias springs 48 and 49 for centering the spool valve 43 within the length of the cylinder 47. The land area 44 of the spool valve 43 when in its center position interrupts an incoming fluid passage 50. Likewise, the land areas 45 and 46 of the spool valve 43, when in its mid-point position, interrupt the fluid return passages 51 and 52, respectively.

The area of the cylinder 47 located between the spool valve land areas 44 and 46 is provided with an output passage 53 connected to a cylinder 54 of the work actuator 42. Likewise, the area of the cylinder 47 located between the spool valve land areas 44 and 45 is provided with an output passage 55 connected to the cylinder 54 of the work actuator 42. The boost valve fluid output passages 53 and 55 enter the cylinder 54 of the work actuator 42 adjacent the opposite ends of the cylinder 54. Positioned within the cylinder 54 and at a point midway between the ends of the cylinder 54 is a piston 56 provided with a piston rod 57 housed within guide bearings 58 and 59. The piston rod 57 of the work actuator 42 is shown mechanically connected to a lever 60 connected to a control surface 61 by a mechanical linkage 62.

Operation of the embodiment shown in Fig. 1 will now be described. If we assume that the gyro 2 displaces the control vane 1 to the left as viewed in the drawings causing the control vane 1 to restrict the orifice 7 and relieve the orifice 8, it can be seen that a buildup of pressure occurs in the pipe 12 while a reduction in pressure takes place in the pipe 14. The increase in pressure within the pipe 12 is delivered through the pipe 20 to the reduced diameter portion 24 of the cylinder 23. Likewise, the reduction in pressure within the pipe 14 is delivered through the pipe 21 to the area within the reduced diameter portion 25 of the cylinder 23. The action of the change in pressure within the reduced diameter areas of the cylinder 23 consequently causes displacement of the piston 22 to the right as viewed in the drawings. During movement of the piston 22 to the right, an increase in pressure occurs in the chamber B and a decrease in pressure occurs in the chamber A of the cylinder 23. The increase in pressure within the chamber B is then felt in the fluid output pipe 41 to the boost valve of the work actuator 42 causing an increase in pressure on the end of the land area 46 of the spool valve 43. The decrease in pressure in the chamber A effects the output pipe 40 causing a corresponding reduction in pressure on the end of the land area 45 of the spool valve 43. This change in pressure then causes the spool valve 43 to be displaced to the left as viewed in the drawings causing the land area 44 to pour fluid from the pressure pipe 50 past the land area 44 into the output pipe 53 of the boost valve and into the cylinder 54 to the right of the piston 56. At the same time, the land area 45 opens the fluid return passage pipe 51 to the cylinder 54 in the zone to the left of the piston 56, as viewed in the drawings. This output passage can be traced from the cylinder 54 out through the passage 55 past the land area 45 and out through the pipe 51. This change in pressure, therefore, causes the piston to move to the left resulting in a movement of the linkages 60 and 62 and a corresponding displacement of the control surface 61.

If the action of the gyro 2 had been to deflect the vane member 1 opposite to the previously described direction, it should be clear that an opposite direction of motion of the work actuator piston 56 would have occurred. It should be pointed out, however, that output pressures within the pipes 40 and 41 become regulated to different levels of pressure only during periods of actual piston 22 movement. When the forces of the bias springs 30 and 31 and the forces of the pressures in the chambers A and B match the differential in pressure within the pipes 20 and 21, the piston 22 ceases to continue its travel from its mid-point position. Since the fluid passage into and out of the chambers A and B of the cylinder 23 is one of continuous fluid flow, it can be seen that cessation of movement of the piston 22 would result in the fluid flow equalizing the pressures within the chambers A and B at the newly arrived position of the piston 22. When the pressures within the pipes 40 and 41 again become equal, the spool valve 43 again returns to its mid-point position thus holding the piston 56 in its newly acquired deflected position. Return of the piston 56 to its mid-point position can only be dictated by an input to the vane member 1 by the gyro 2.

Figure 2:
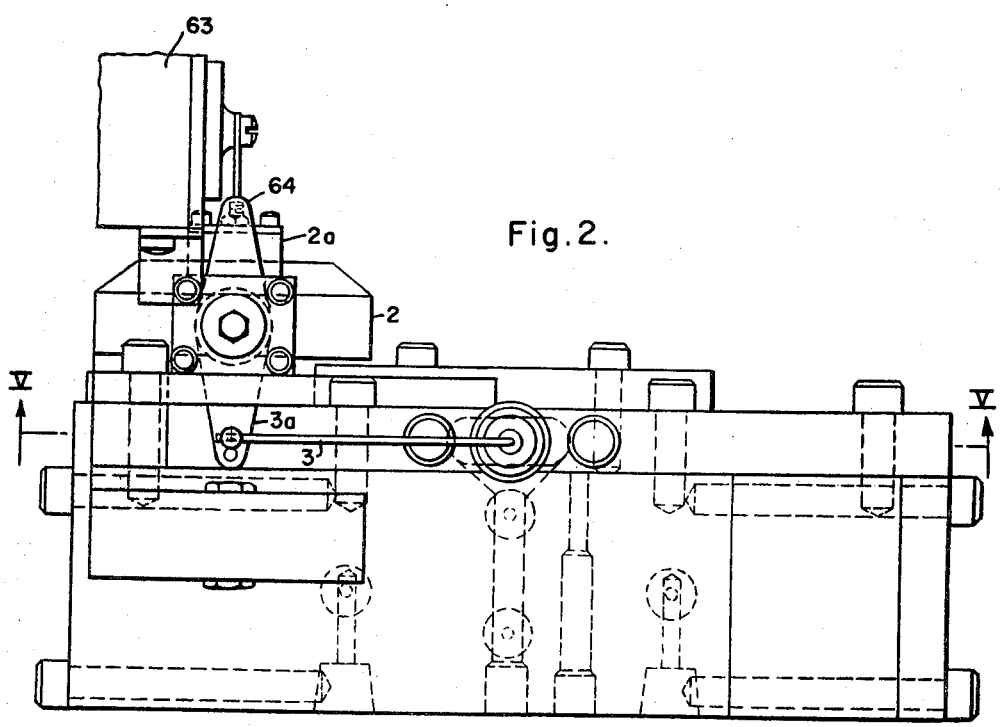
Fig. 2 is an elevational view of the valve showing its relationship to an associated control gyro.

The view in Fig. 2 shows the actual structural relationship between the vane member 1 and the gyro 2 involving the linkage 3 provided with a lever arm 3a connected to the gimbal 2a of the gyro 2. The gyro 2 is additionally provided with a damping device 63 connected to the gyro gimbal 2a through the actuating arm 64.

The view of Fig. 3 shows the relationship between the vane member 1 and the gyro 2 and additionally shows the position of the damping device 63 with respect to the gyro 2.

Figure 4:
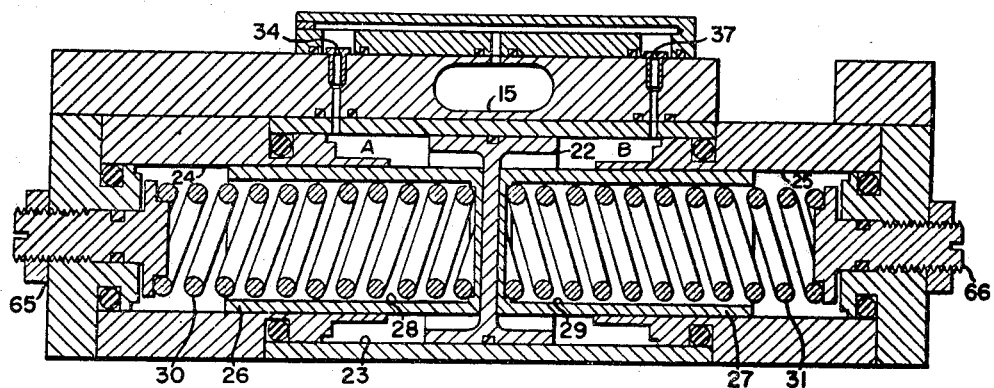
Fig. 4 is a sectional view taken along line IV—IV of Fig. 3 showing the dynamic piston of the second stage in detail.

The sectional view of Fig. 4 shows one form of actual structure of the dynamic piston 22 of the second stage. In this view, an adjustment means 65 and 66 is shown for the bias springs 30 and 31.

Fig. 5 shows one form of structure of the first stage of the control valve. This figure shows the relationship of the vane member 1 to the orifices 7 and 8. The view also shows the O-ring seal 6 about which the vane member 1 acts in pivotal motion.

The control vane 1 of the valve of this invention may also be controlled by other suitable driving means such as a torque motor 67. The torque motor 67 is provided with a coil 68 positioned within a magnetic structure 69 polarized by a permanent magnet 70. The control vane 1 is supported within a non-magnetic tube 71 and is deflected in one direction or the other by coil 68 input currents of one polarity or the other. The input currents are supplied to the coil 68 by any suitable control device such as a gyro (not shown).

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A high frequency responsive valve comprising a pair of opposing fluid flow orifices, a control member positioned between said orifices for varying fluid flow through said orifices, control pressure pipes connected to said orifices, said control member fluid flow variations causing fluid pressure variations in said control pressure pipes, dynamic pressure responsive means providing output control pressures only during pressure changes within said pressure control pipes.

2. A high frequency responsive valve comprising a pair of opposing fluid flow orifices, a control member positioned between said orifices for varying fluid flow through said orifices, control pressure pipes connected to said orifices, said control member fluid flow variations causing fluid pressure variations in said control pressure pipes, dynamic pressure responsive means capable of providing output control pressures during pressure changes within said pressure control pipes, said pressure responsive means comprising a piston having control areas capable of providing an output only during pressure changes in said control pressure pipes.

3. A high frequency responsive valve comprising a pair of opposing fluid flow orifices, a control vane positioned between said orifices for varying fluid flow through said orifices, control pressure pipes connected to said orifices, said control vane fluid flow variations causing fluid pressure variations in said control pressure pipes, dynamic pressure responsive means capable of providing output control pressures during pressure changes within said pressure control pipes, said pressure responsive means comprising a piston having control areas capable of providing an output only during pressure changes in said control pressure pipes, said piston having first and second pairs of pressure areas, said first pair of pressure areas being responsive to pressures within said control pipes, said second pair of pressure areas providing differential output pressures only during travel of said piston.

4. A high frequency responsive valve comprising a pair of opposing fluid flow orifices, a control vane positioned between said orifices for varying fluid flow through said orifices, control pressure pipes connected to said orifices, said control vane fluid flow variations causing fluid pressure variations in said control pressure pipes, dynamic pressure responsive means capable of providing output control pressures during pressure changes within said pressure control pipes, said pressure responsive means comprising a piston having control areas capable of providing an output only during pressure changes in said control pressure pipes, said piston having first and second pairs of pressure areas, said first pair of pressure areas being responsive to pressures within said control pipes, said second pair of pressure areas providing differential output pressures only during movement of said piston, a work actuator, said output pressures causing work actuator movement during a differential in said output pressures.

5. A high frequency responsive valve comprising a pair of opposing fluid flow orifices, a control vane positioned between said orifices for varying fluid flow through said orifices, control pressure pipes connected to said orifices, said control vane fluid flow variations causing fluid pressure variations in said control pressure pipes, dynamic pressure responsive means capable of providing output control pressures during pressure changes within said pressure control pipes, said pressure responsive means comprising a piston having control areas capable of providing an output only during pressure changes in said control pressure pipes, said piston having first and second pairs of pressure areas, said first pair of pressure areas being responsive to pressures within said control pipes, said second pair of pressure areas providing differential output pressures only during movement of said piston and bias springs for centering said piston and opposing said movement.

6. A gyro controlled valve for sensing angular velocity of a body comprising, hydraulic valve means, hydraulic filter means responding to the output of said valve means, said hydraulic filter means being capable of providing a filter means output only in response to alternating outputs from said valve means, said hydraulic filter means being incapable of providing a filter means output in response to steady valve means output, said filter means comprising a movable member having a first portion responsive to said valve means output and a second portion for providing said filter means output during alternating valve means output, said first portion comprising opposing piston ends, and bias springs positioned to move said movable member to a stable neutral position during steady hydraulic valve output periods.

7. A gyro controlled valve for sensing angular velocity of a body comprising, hydraulic valve means, hydraulic filter means responding to the output of said valve means, said hydraulic filter means being capable of providing a filter means output in response to alternating outputs from said valve means, said hydraulic filter means being incapable of providing a filter means output in response to steady valve means output, said filter means comprising a movable member having a first portion responsive to said valve means output and a second portion for providing said filter means output during alternating valve means output, said first portion comprising opposing piston ends, and bias springs positioned to move said movable member to a stable neutral position during steady hydraulic valve output periods, and recesses within said piston ends for receiving said bias spring.

References Cited in the file of this patent
UNITED STATES PATENTS

| Number | Name | Date |
|---|---|---|
| 2,209,735 | Lauch | July 30, 1940 |
| 2,517,081 | Caldwell | Aug. 1, 1950 |
| 2,582,088 | Walthers | Jan. 8, 1952 |
| 2,584,125 | Haglund | Feb. 5, 1952 |
| 2,635,581 | Karig | Apr. 21, 1953 |
| 2,698,023 | Echman | Dec. 28, 1954 |
| 2,709,421 | Avery | May 31, 1955 |
| 2,767,689 | Moog | Oct. 23, 1956 |
| 2,834,363 | Pessen | May 13, 1958 |
| 2,835,265 | Brandstadter | May 20, 1958 |
| 2,878,825 | Grogan | Mar. 24, 1959 |
| 2,880,708 | Hayner | Apr. 7, 1959 |